(12) United States Patent
Yen et al.

(10) Patent No.: US 6,711,004 B2
(45) Date of Patent: Mar. 23, 2004

(54) PORTABLE ELECTRONIC APPARATUS FOR SELECTIVELY OPERATING IN NORMAL MODE AND TABLET MODE (75) Inventors: Chia-Lian Yen, Taipei Hsien (TW); Tsao-Yu Lee, Taipei Hsien (TW); Hua-Chung Tseng, Taipei Hsien (TW); Chang-Long Hsu, Taipei Hsien (TW); Chu-Hsian Chian, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 78 days.

(21) Appl. No.: 10/142,092

(22) Filed: May 8, 2002

(65) Prior Publication Data
US 2003/0210513 A1 Nov. 13, 2003

(51) Int. Cl.[7] ................................................. G06F 1/16
(52) U.S. Cl. ..................... 361/681; 361/682; 312/223.1; 345/169
(58) Field of Search ................................. 361/680, 681, 361/682, 683; 312/223.1, 223.6; 345/169, 905; 16/223, 365, 366, 378, 379; 439/164, 165; 364/708.1, 709.01, 709.1

(56) References Cited

U.S. PATENT DOCUMENTS

| 5,255,214 | A | * | 10/1993 | Ma ............................. 361/680 |
| 5,481,430 | A | * | 1/1996 | Miyagawa et al. .......... 361/681 |
| 5,548,478 | A | * | 8/1996 | Kumar et al. ............... 361/681 |
| 6,262,885 | B1 | * | 7/2001 | Emma et al. ................ 361/683 |
| 6,266,236 | B1 | * | 7/2001 | Ku et al. ..................... 361/681 |
| 6,275,376 | B1 | * | 8/2001 | Moon .......................... 361/683 |

FOREIGN PATENT DOCUMENTS

JP     406175750 A  *  6/1994  ............. G06F/1/16

* cited by examiner

Primary Examiner—Michael Datskovskiy
(74) Attorney, Agent, or Firm—Merchant & Gould, P.C.

(57) ABSTRACT

A portable electronic apparatus for selectively operating in normal mode and tablet mode includes a trigger device that generates a signal and a trigger value after being activated; a processing center that, in response to the signal, retrieves from the portable electronic apparatus a normal value corresponding to normal mode, and compares the normal value and the trigger value to obtain a comparison result; and an executing unit that, according to the comparison result, selectively executes normal mode and tablet mode.

19 Claims, 10 Drawing Sheets

PORTABLE ELECTRONIC APPARATUS FOR SELECTIVELY OPERATING IN NORMAL MODE AND TABLET MODE

BACKGROUND OF THE INVENTION

1. Field of the Invention

The invention relates to a portable electronic apparatus for selectively operating in normal mode and tablet mode, and more particularly to a notebook computer with a swivel liquid crystal display, and a method and apparatus for enabling a selective operation in normal mode and tablet mode.

2. Description of the Related Art

Since the current trend of portable computer devices is toward the goals of lightness, compactness and convenience, as well as integration with multimedia, the product design of notebook computers available on the market is also moving toward integration of multimedia functions.

Figure 1:
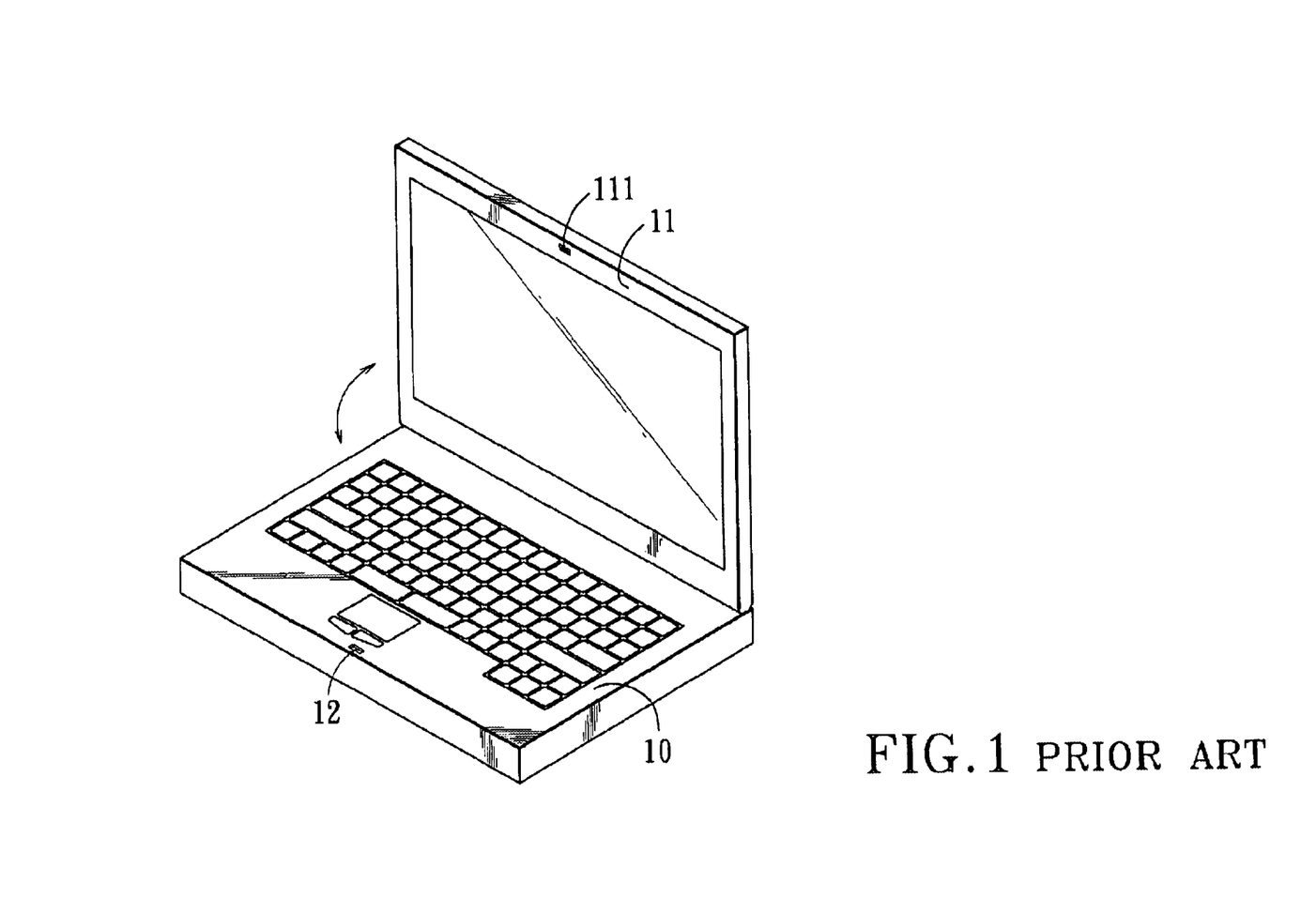
FIG. 1 is an assembled perspective view of a conventional notebook computer.

As shown in FIG. 1, a notebook computer available on the market generally includes a computer system 10 and a liquid crystal display module 11. When the notebook computer is in a non-use state, the liquid crystal display module 11 is engaged upon the computer system 10. At this time, insert pins 111 on the liquid crystal display module 11 are used to engage the computer system 10. When a user desires to disengage the notebook computer for use, the user then disengages the insert pins 111 provided on the liquid crystal display module 11 from the computer system 10 so as to allow the liquid crystal display module 11 to move to an disengaged position for computer operation.

When a notebook computer is in operation, there is a possibility that a user may desire to engage the notebook computer and bring the notebook computer elsewhere to work without shutting down the notebook computer. Therefore, in a conventional notebook computer, a liquid crystal display switch controller 12 is often provided to cause the liquid crystal display module 11 to temporarily enter into a sleep state when the liquid crystal display module 11 is off so as to prevent the system and components within the notebook computer from generating excessive heat, which leads to possible computer crash and a reduced service life of the notebook computer.

In order to avoid such circumstances, the user can choose to first exit from the use state, turn off the power, and then engage the computer system 10 with the liquid crystal display module 11. Furthermore, current notebook computers generally provide support for advanced power management, and utilize the sensor control of the aforesaid liquid crystal display switch controller 12 to enable the notebook computer to enter into a standby state, a sleep state, or a paused state as the user desires.

However, for a notebook computer with a swivel liquid crystal display module, it is not only usable in normal mode, i.e., the liquid crystal display panel on the liquid crystal display module being oriented toward the keyboard surface on the computer system to be brought proximate thereto or away therefrom, but also usable when the liquid crystal display module is swiveled to bring the rear side of the liquid crystal display module proximate to the keyboard surface to be usable in tablet mode.

Therefore, in order for the notebook computer to operate in tablet mode and perform its functions, the present invention provides a method and apparatus with a swivel liquid crystal display to selectively operate in normal mode and tablet mode, and to integrate the interface linking of these two modes so as to facilitate entry into the use state, standby state, sleep state or paused state according to the user's requirements.

SUMMARY OF THE INVENTION

Therefore, the main object of the present invention is to provide a portable electronic apparatus that provides selective operation in either a normal mode and tablet mode so as to enable the user to set desired operation mode and optimize the performance of the portable electronic apparatus.

Accordingly, a portable electronic apparatus of the present invention includes a trigger device that generates a signal and a trigger value after being activated, a processing center for retrieving from the portable electronic apparatus a normal value corresponding to normal mode in response to the signal and for comparing the normal value and the trigger value to obtain a comparison result, and an executing unit that, according to the comparison result, selectively executes normal mode and tablet mode.

Preferably, the trigger device is a sensor for detecting the status of the signal.

Preferably, the processing center includes a basic input/output system and a central processing unit for receiving the signal.

Preferably, the signal is a request signal.

Preferably, the basic input/output system and the central processing unit have an executable processing program for responding to the signal.

Preferably, the processing program is executed to read and compare the normal value and the trigger value.

Preferably, the processing center has an executable application program with configurable user preferences such that user is free to set the user preferences and optimizes the performance of the electronic apparatus when the portable electronic apparatus operates in normal mode.

Preferably, the application program is a temperature control program for reducing temperature of the portable electronic apparatus and entering a low power consuming state.

Preferably, the application program is an application program of a simulated personal digital assistant to enable the user to access and input data via an input device when the portable electronic apparatus operates in normal mode.

Preferably, the input device is a stylus.

Another object of the present invention is to provide a method for enabling a portable electronic apparatus to selectively operate in normal mode and tablet mode so as to enable the portable electronic apparatus to operate in a state of relatively low power consumption.

Accordingly, the method of the present invention includes the steps of:

(a) activating a trigger device to generate a signal and retrieve a trigger value corresponding to the signal;

(b) in response to the signal, enabling a processing center to retrieve from the portable electronic apparatus a normal value corresponding to normal mode, and to compare the normal value with the trigger value to obtain a comparison result; and (c) according to the comparison result, selectively executing normal mode and tablet mode.

Preferably, the step (a) further includes a step (d) of providing the signal to the processing center.

Preferably, the step (b) further includes a step (e) of executing an interrupt program to enable the processing center to compare the normal value and the trigger value.

A further object of the present invention is to provide a method for enabling a portable apparatus to selectively operate in normal mode and tablet mode so that the user can use different application programs to operate the portable electronic apparatus as desired both in normal mode or tablet mode.

Accordingly, the portable electronic apparatus has a first switch and a second switch to respectively control operation of normal mode and tablet mode. The method comprises the steps of:

(a) activating the portable electronic apparatus to generate a signal;

(b) in response to the signal, detecting the status of the first switch and the second switch; and (c) executing normal mode when the first switch is detected in the on position, and executing tablet mode when the second switch is detected in the on position.

Preferably, the step (b) further includes a step (d) in which, when the first switch is in the on position, an interrupt signal is generated to notify the portable electronic apparatus to proceed with an interrupt processing program to execute normal mode.

Preferably, the step (b) further includes a step (e) in which, when the second switch is in the on position, an interrupt signal is generated to notify the portable electronic apparatus to proceed with an interrupt processing program to execute tablet mode.

Still another object of the present invention is to provide a portable electronic apparatus that enables the user to use the same in normal mode and tablet mode.

Accordingly, the portable electronic apparatus for selectively operating in normal mode and tablet mode includes: a liquid crystal display module; a computer system for controlling operation of the liquid crystal display module, the computer system having a switch, the computer system and the liquid crystal display module being operable in normal mode and tablet mode via activation of the switch; and a processing system stored in the computer system to execute normal mode and for, in response to activation of the switch, enabling the portable electronic apparatus to selectively operate in normal mode and tablet mode.

Preferably, the processing system includes: an activating device that generates a signal and a trigger value after the switch is activated; a processing center for, in response to the signal, retrieving from the portable electronic apparatus a normal value corresponding to normal mode, and for comparing the normal value and the trigger value to obtain a comparison result; and an executing unit that, according to the comparison result, selectively executes normal mode and tablet mode.

Yet another object of the present invention is to provide a portable electronic apparatus that enables the user to operate the same in a simulated personal digital assistant mode.

Accordingly, the portable electronic apparatus of the present invention is used for selectively operating in normal mode and tablet mode, and includes a touch-control liquid crystal display module; a computer system for controlling operation of the liquid crystal display module, the computer system having a first switch and a second switch such that activation of the first switch and the second switch enable the computer system and the liquid crystal display module to operate selectively in normal mode and tablet mode; and a processing system stored in the computer system to execute normal mode and, in response to the activation of the first switch and the second switch, for enabling the portable electronic apparatus to selectively operate in normal mode and tablet mode.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 2:
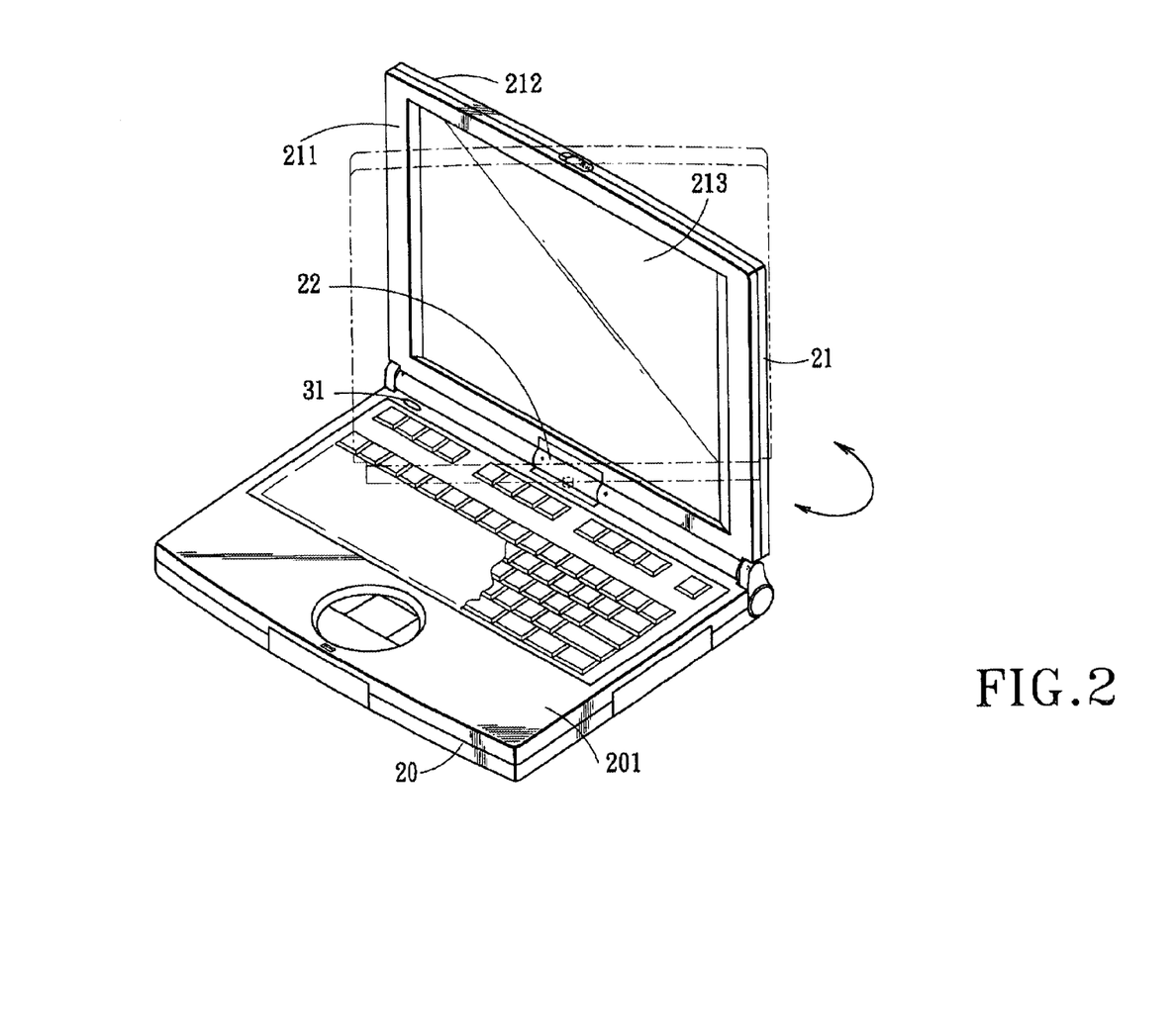
FIG. 2 is a preferred embodiment of a portable electronic apparatus for selectively operating in normal mode and tablet mode according to the present invention, illustrating swiveling operation of a liquid crystal display module thereof.

Referring to FIG. 2, the preferred embodiment of a notebook computer according to the present invention is shown to include a computer system 20 and a liquid crystal display module 21. The computer system 20 has an upper surface 201, and the liquid crystal display module 21 has a front surface 211 and a rear surface 212. The front surface 211 is provided with a screen 213 for displaying data.

The liquid crystal display module 21 according to the present invention is connected to the computer system 20 by a swivel device 22. The swivel device 22 has one end secured to the computer system 20, and another end connected pivotally to the liquid crystal display module 21. The swivel device 22 serves to enable the front surface 211 of the liquid crystal display module 21 to be brought proximate to or away from the upper surface 201 of the computer system 20. That is, the notebook computer is usable either in an engage position or a disengage position under the aforesaid normal mode. The swivel device 22 further enables the liquid crystal display module 21 to swivel relative to and above the upper surface 201 of the computer system 20. After the liquid crystal display module 21 swivels, the rear surface 212 thereof is brought away from or proximate to the upper surface 201 of the computer system 20. That is, the notebook computer can be deployed in the aforesaid tablet mode to enable the user to input via the screen 213 directly and execute functions (see FIG. 10).

Figure 3:
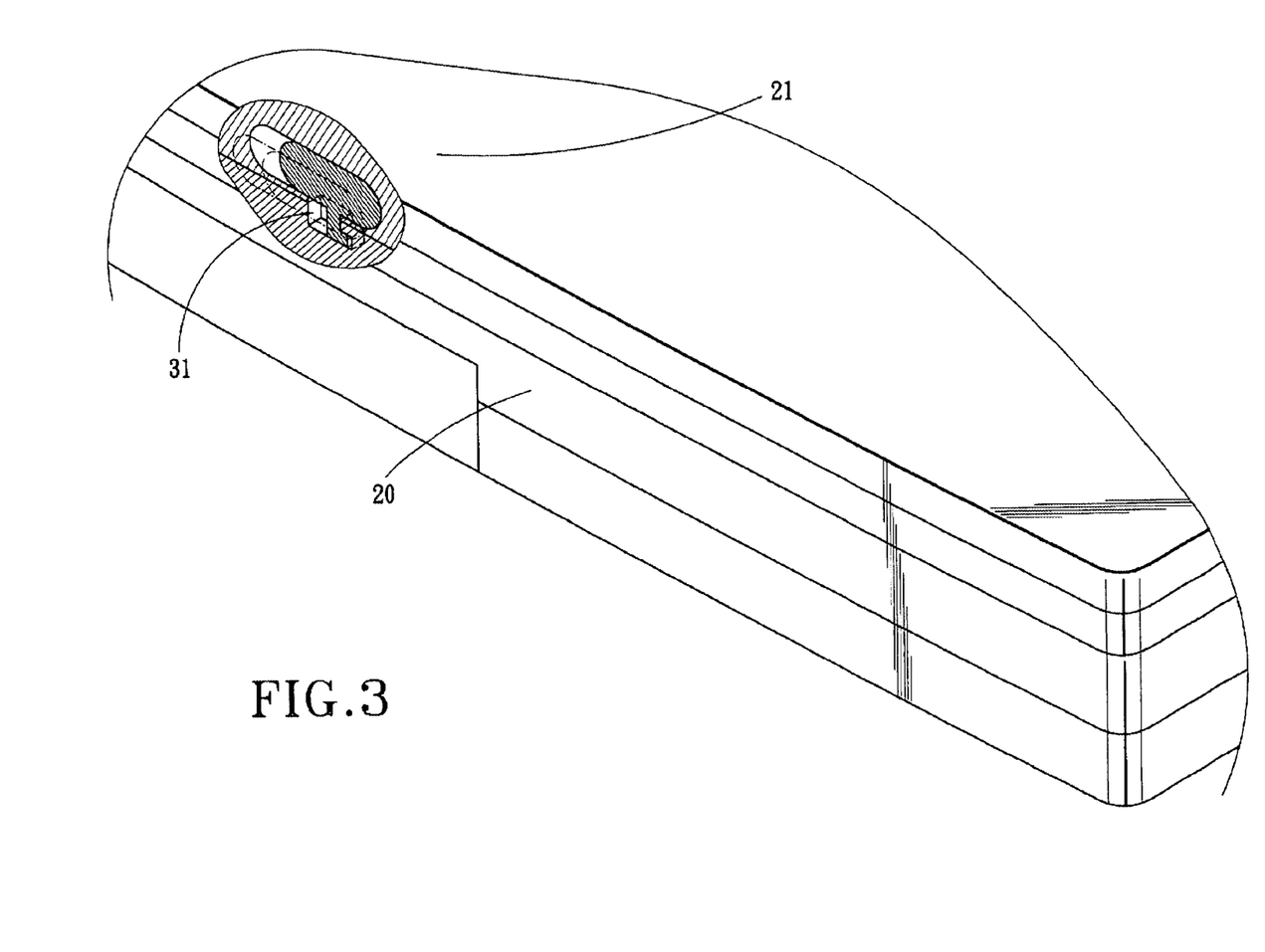
FIG. 3 is a partly enlarged, partly sectional, fragmentary perspective view of the preferred embodiment, illustrating the location of a control switch.
Figure 4:
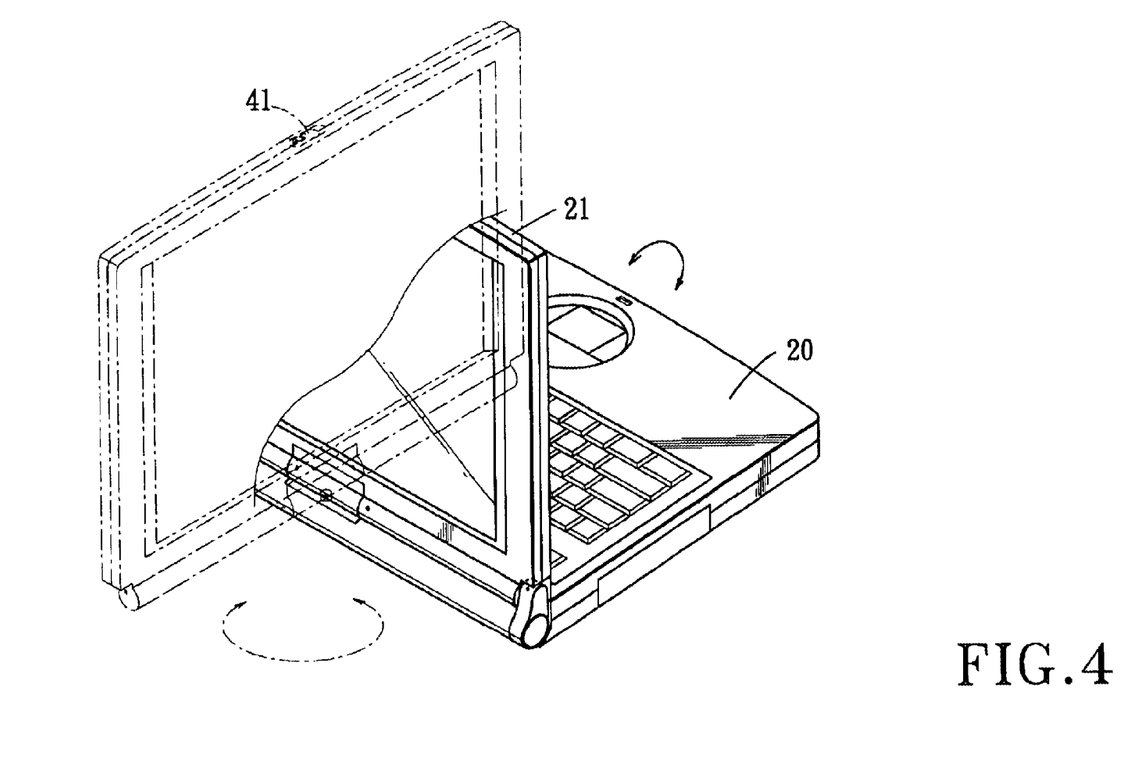
FIG. 4 is a fragmentary perspective view of the preferred embodiment in an extended state, illustrating the location of another control switch.
Figure 5:
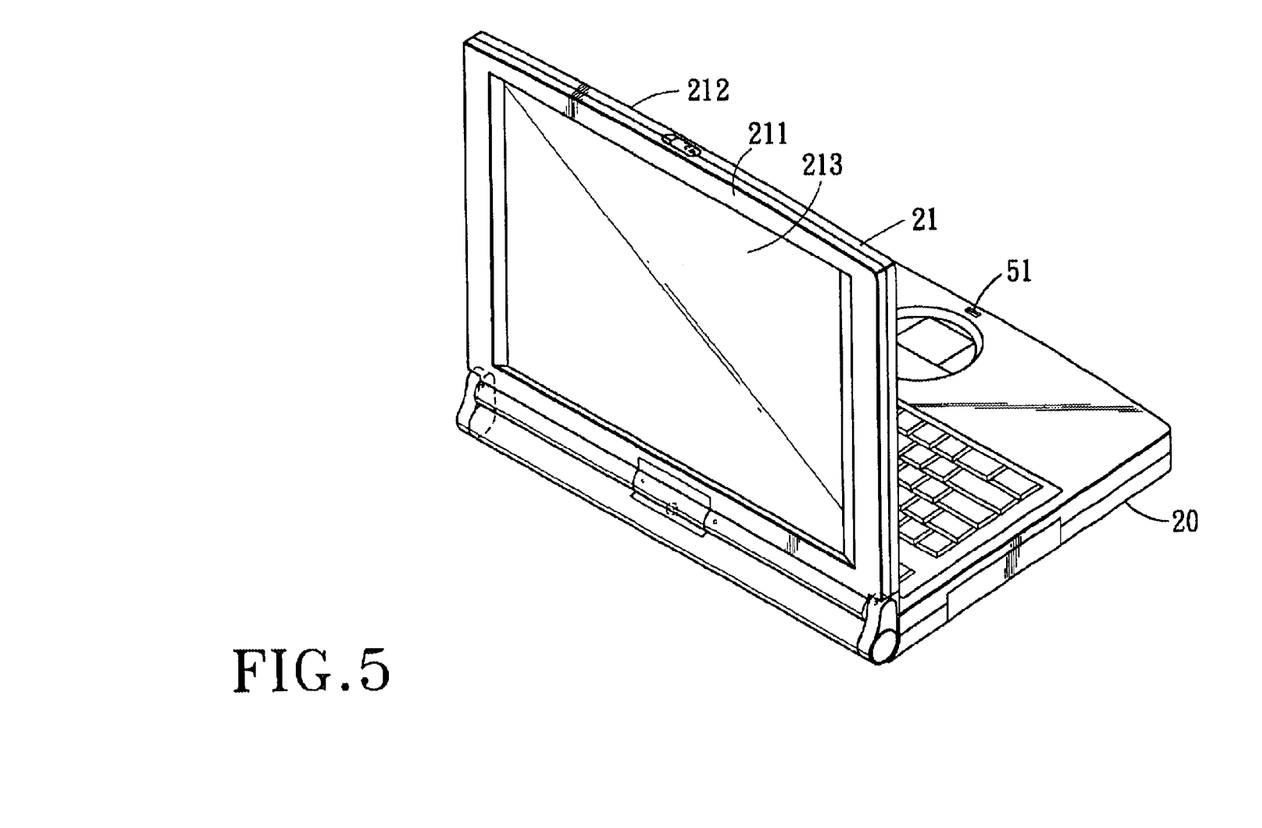
FIG. 5 is a perspective view of the preferred embodiment, illustrating the location of an integrated control switch.

Referring to FIG. 3, in combination with FIG. 2, the invention provides a control switch 31 disposed on the computer system 20. By activating the control switch 31, the notebook computer is enabled to operate in normal mode. In addition, referring to FIG. 4, the invention further provides another control switch 41 that is disposed on the liquid crystal display module 21. By virtue of activating the control switch 41, the notebook computer is enabled to operate in tablet mode. Certainly, in another preferred embodiment, the control switches 31, 41 are disposed on either of the computer system 20 and the liquid crystal display module 21, or integrated in a switch device 51, as shown in FIG. 5.

Figure 6:
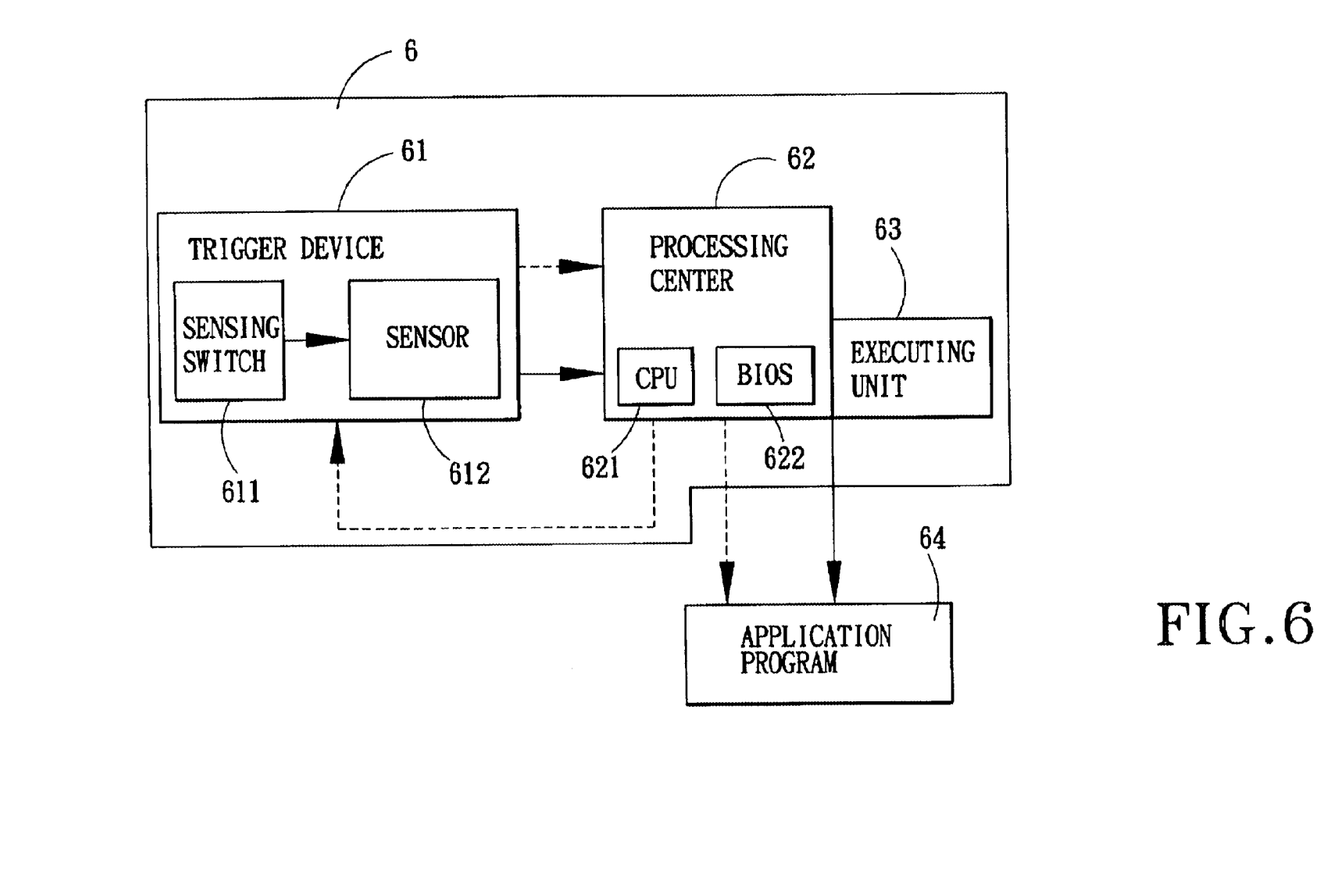
FIG. 6 is a schematic circuit block diagram of a computer system of the preferred embodiment, illustrating the major components thereof.

FIG. 6 illustrates a preferred embodiment employed to enable a notebook computer to operate in and switch between a normal mode and tablet mode.

In this preferred embodiment, a notebook computer 6 includes a trigger device 61, a processing center 62 and an executing unit 63 to enable the notebook computer 6 to switch between and operate selectively in normal mode and tablet mode.

Figure 7:
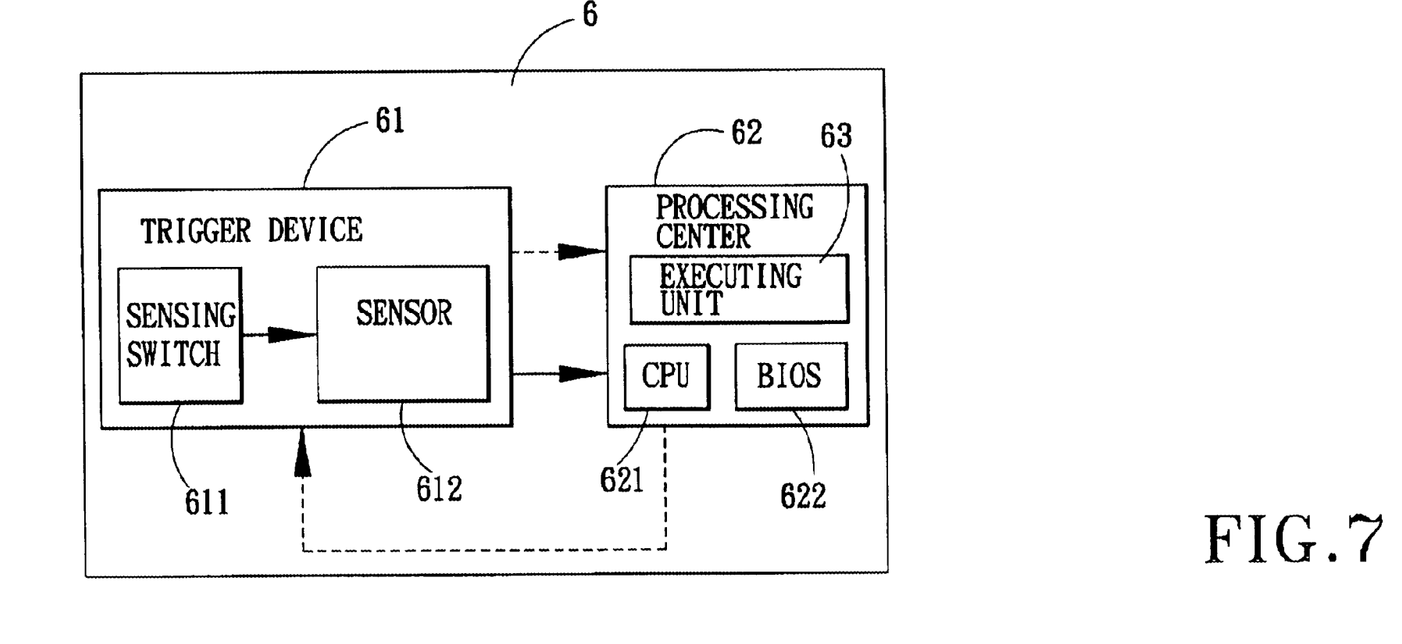
FIG. 7 is a schematic circuit block diagram of another preferred embodiment of a computer system for selectively operating in normal mode and tablet mode, showing the major components thereof.

In the actual design of the notebook computer 6, the trigger device 61 refers to the control switches 31, 41 described above. Alternatively, the control switches 31, 41 can be integrated into a sensing switch 611 via setting of specific keys or through a computer system setting. The trigger device 61 further includes a sensor 612 for sensing triggering of the sensing switch 611 or for sensing an activating signal. The processing center 62 mainly includes a central processing unit (CPU) 621 and a basic input/output system (BIOS) 622 to execute built-in executable programs or application programs 64 that need to be executed, and is responsible for processing the execute signals of the notebook computer 6. Certainly, the arrangement of chipsets, data transmission interfaces, buses, etc., is indispensable to assist the processing center 62 to for selectively operating in normal mode and tablet mode. In addition, it is noted that the executing unit 63 can be separated from the processing center 62 (see FIG. 6) to execute normal mode or tablet mode. In another preferred embodiment (see FIG. 7), the executing unit 63 can be integrated with the processing center 62. The location of the executing unit 63 in the preferred embodiments illustrated in FIGS. 6 and 7 can be modified by a person skilled in the art, and modified locations thereof should be deemed to fall within the scope of the notebook computer 6 according to the invention. The operation of the application programs 64 can be executed via direct commands from the processing center 62, or the application programs 64 per se can be other software or other application programs added to the system of the notebook computer 6 to execute various application programs in normal mode or tablet mode.

Figure 8:
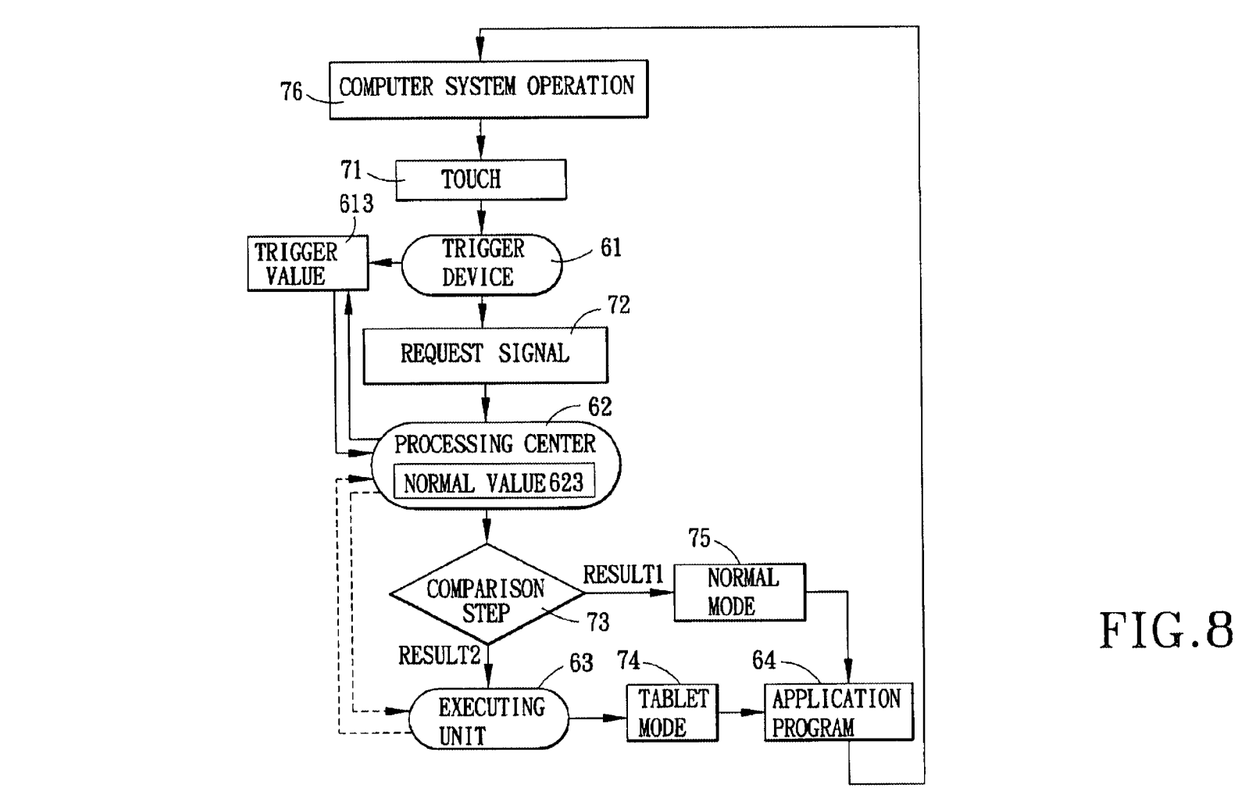
FIG. 8 is a flowchart of a preferred embodiment of a method for enabling a portable apparatus to selectively operate in normal mode and tablet mode.

FIG. 8 illustrates the preferred embodiment of a method for enabling the computer system of a notebook computer to selectively operate in normal mode and tablet mode, which is evolved from the construction shown in FIG. 6. When an action of touch 71 is transmitted to the sensor 612 within the trigger device 61, a request signal 72 and a trigger value 613 will be generated. When the request signal 72 (which is a processing interrupt signal) is further transmitted to the processing center 62, the processing center 62 will retrieve from the computer system a normal value 623 which corresponds to normal mode, and will simultaneously execute a comparison step 73 (by executing a built-in processing interrupt program) to compare the trigger value 613 generated by the trigger device 61 with the normal value 623. If the comparison result shows that the trigger value 613 is greater than the normal value 623, a result (I) will be generated to cause the executing unit 63 to execute activation of tablet mode 74. If the comparison result shows that the trigger value 613 is smaller than the normal value 623, a result (II) will be generated to enter into normal mode 75. The method for comparing the trigger value 613 with the normal value 623 is subject to change via the original program, and tablet mode 74 and normal mode 75 are respectively executed according to the final settings. When operating the computer, certain application programs available in the market can be executed in either tablet mode 74 or normal mode 75. However, the application programs used in the present invention can be integrated to be suitable for execution in both tablet mode 74 and normal mode 75.

Figure 9:
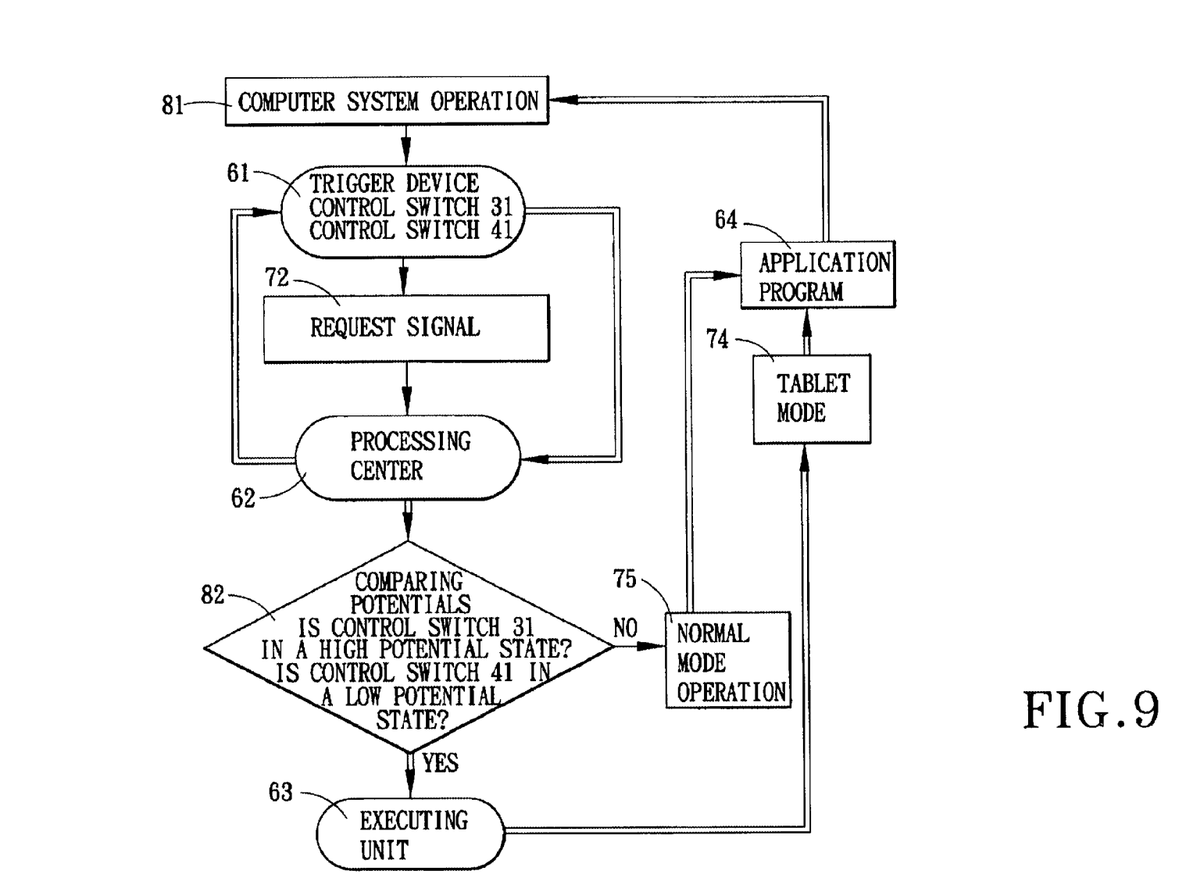
FIG. 9 is a flowchart of another preferred embodiment of the method for enabling a portable apparatus to selectively operate in normal mode and tablet mode.

FIG. 9 illustrates another preferred embodiment of the method for enabling a notebook computer to selectively operate in normal mode and tablet mode, which is evolved from the aforesaid construction. When the computer is in an operating state 81, and a trigger signal is sensed by the control switch, e.g., one of the control switches 31, 41 of the trigger device 61, the control switch will generate a request signal 72. When the request signal 72 is transmitted to the processing center 62, the processing center 62 will detect the status of the control switch 31 or the control switch 41 and the corresponding potential value. Next is a comparison step 82 in which the respective potential values of the control switch 31 and the control switch 41 are compared.

As described hereinbefore, the control switch 41 is disposed to correspond to a sensing switch of tablet mode, whereas the control switch 31 is disposed to correspond to another sensing switch of normal mode. Generally speaking, when a control switch is in the on position, it is in a low potential state, and when the control switch is in the off position, it is in a high potential state. Therefore, after the processing center 62 has compared the potential values of the control switch 31 and the control switch 41, and has detected that the control switch 41 is in the on position whereas the control switch 31 is in the off position, the processing center 62 will cause the executing unit 63 to execute activation of tablet mode 74. Similarly, integrated application programs are required to execute in both normal mode and tablet mode. More particularly, a specific application program can be created in tablet mode for execution by the computer system.

In the provision and operational function of the application program, the invention achieves the following objects and functions through the application programs that are set and that are executed as the user desires:

1. Making settings to prevent the notebook computer from emitting interfering sounds.
2. Setting light indicators relating to closure and other actions.
3. Setting a temperature control of the application programs so that the temperature of the notebook computer reduces and so as to enter into a low power consumption state.
4. Setting a vertical or horizontal screen for browsing purposes according to the habits of the user.
5. Permitting setting of software needed for inputting, for instance, a stylus cooperating with handwriting input software or a soft keypad.
6. Integrating software commonly used in normal mode.
7. Activating a simulated personal digital assistant mode.

Figure 10:
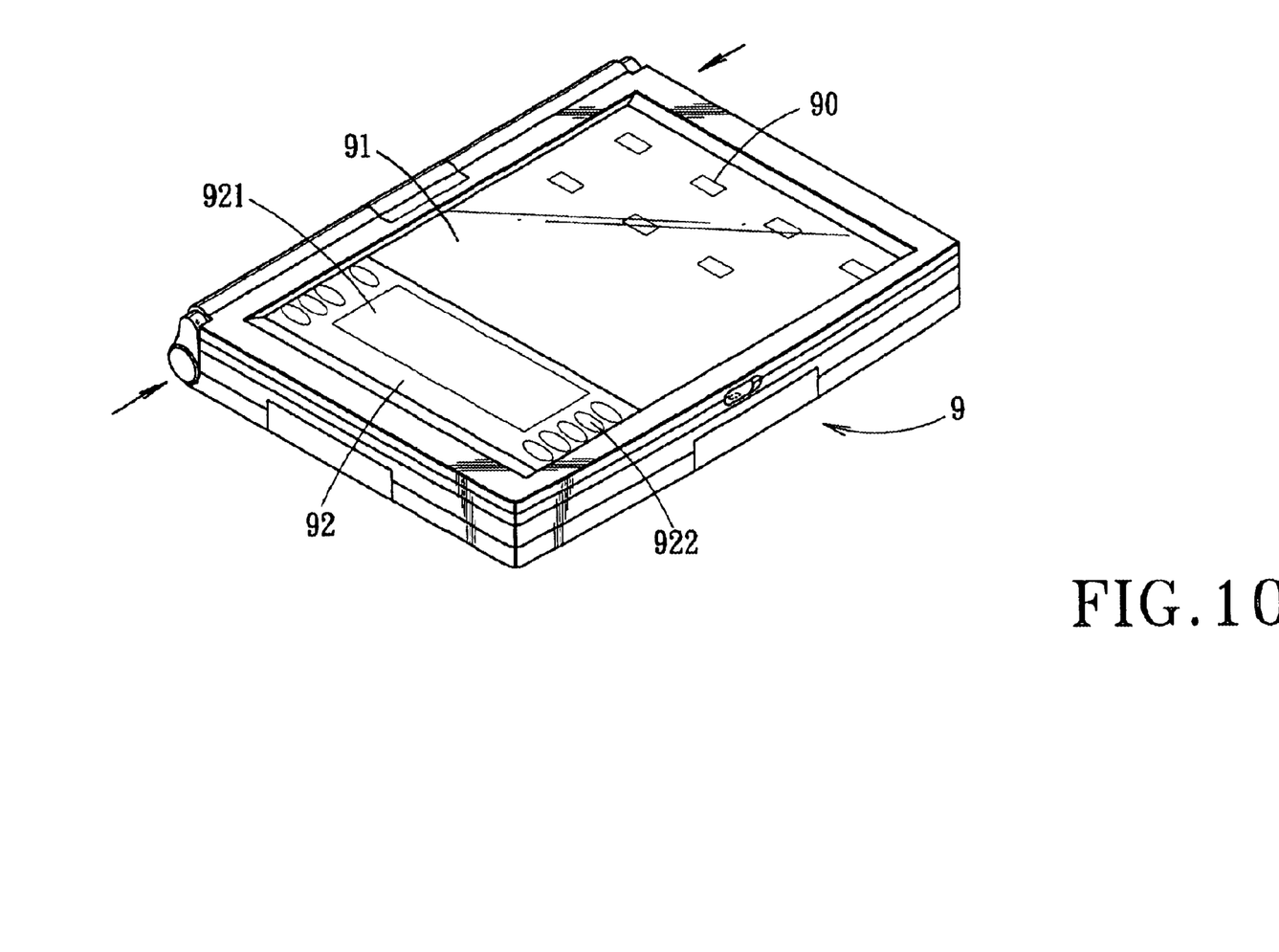
FIG. 10 is a perspective view of a portable electronic apparatus incorporating the present invention when operates in a simulated personal digital assistant mode.

Referring to FIG. 10, the present invention further provides a notebook computer 9 that operates in tablet mode to simulate a personal digital assistant. In this preferred embodiment, when operating in tablet mode, the BIOS notifies the application program to respond to the user's settings and permit the user to use a simulated personal digital assistant operating environment 90 as shown in FIG. 10, and in conjunction with a working mode to support a graphics card or other peripheral interface cards, for instance, increasing the standby time of the notebook computer. It is further illustrated in FIG. 10 that, in the simulated personal digital assistant operating environment 90, the screen can be roughly divided into a program inspecting portion 91 and an easy control portion 92. In using the program inspecting portion 91, the user can add shortcuts of frequently used software, whereas the easy control portion 92 provides a handwriting input area 921, a screen rotating control 922, and other application software, such as a soft keypad, electronic books, etc.

In summary, the notebook computer of this invention is used for selectively operating in normal mode and tablet mode, and utilizes a trigger device that cooperates with a processing center to achieve the object of enabling a selective operation in normal mode and tablet mode.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A portable electronic apparatus for selectively operating in normal mode and tablet mode, comprising:
    a trigger device for generating a signal and a trigger value after being activated;
    a processing center for, in response to said signal, retrieving from said portable electronic apparatus a normal value corresponding to normal mode, and for comparing the normal value and said trigger value to obtain a comparison result; and
    an executing unit for selectively executing normal mode and tablet mode according to said comparison result.

2. The portable electronic apparatus as claimed in claim 1, wherein said trigger device is a sensor for detecting the status of said signal.

3. The portable electronic apparatus as claimed in claim 1, wherein said processing center includes a basic input/output system and a central processing unit for receiving said signal.

4. The portable electronic apparatus as claimed in claim 3, wherein said signal is a request signal.

5. The portable electronic apparatus as claimed in claim 3, wherein said basic input/output system and said central processing unit have an executable processing program for responding to said signal.

6. The portable electronic apparatus as claimed in claim 5, wherein said processing program is executed to read and compare the normal value and said trigger value.

7. The portable electronic apparatus as claimed in claim 1, wherein said processing center has an executable application program with configurable user preferences.

8. The portable electronic apparatus as claimed in claim 7, wherein said application program is a temperature control program for reducing temperature of said portable electronic apparatus and entering a low power consuming state.

9. The portable electronic apparatus as claimed in claim 7, wherein said application program is an application program of a simulated personal digital assistant to enable the user to access and input data via an input device when said portable electronic apparatus operates in normal mode.

10. The portable electronic apparatus as claimed in claim 9, wherein said input device is a stylus.

11. A method for enabling a portable electronic apparatus to selectively operate in normal mode and tablet mode, comprising the steps of:
    (a) activating a trigger device to generate a signal and retrieve a trigger value corresponding to said signal;
    (b) in response to said signal, enabling a processing center to retrieve from said portable electronic apparatus a normal value corresponding to normal mode, and to compare the normal value with said trigger value to obtain a comparison result; and
    (c) according to said comparison result, selectively executing normal mode and tablet mode.

12. The method as claimed in claim 11, wherein said step (a) further includes a step (d) of providing said signal to said processing center.

13. The method as claimed in claim 11, wherein said step (b) further includes a step (e) of executing an interrupt program to enable said processing center to compare said normal value and said trigger value.

14. A method for enabling a portable electronic apparatus to selectively operate in normal mode and tablet mode, said portable electronic apparatus having a first switch and a second switch to respectively control operation of normal mode and tablet mode, comprising the steps of:
    (a) activating said portable electronic apparatus to generate a signal;
    (b) in response to said signal, detecting the status of said first switch and said second switch; and
    (c) executing normal mode when said first switch is detected in the on position, and executing the tablet mode when said second switch is detected in the on position.

15. The method as claimed in claim 14, wherein said step (b) further includes a step (d) in which, when said second switch is in the on position, an interrupt signal is generated to notify said portable electronic apparatus to proceed with an interrupt processing program to execute normal mode.

16. The method as claimed in claim 14, wherein said step (b) further includes a step (e) in which, when said second switch is in the on position, an interrupt signal is generated to notify said portable electronic apparatus to proceed with an interrupt processing program to execute tablet mode.

17. A portable electronic apparatus for selectively operating in normal mode and tablet mode, comprising:
    a liquid crystal display module;
    a computer system for controlling operation of said liquid crystal display module, said computer system having a switch, said computer system and said liquid crystal display being operable in normal mode and tablet mode via activation of said switch; and
    a processing system stored in said computer system to execute normal mode and, in response to activation of said switch, for enabling said portable electronic apparatus to selectively operate in normal mode and tablet mode.

18. The portable electronic apparatus as claimed in claim 17, wherein said processing system includes:
    a trigger device that generates a signal and a trigger value after said switch is activated;
    a processing center for, in response to said signal, retrieving from said portable electronic apparatus a normal value corresponding to normal mode, and for comparing said normal value and said trigger value to obtain a comparison result; and an executing unit that, according to said comparison result, selectively executes normal mode and tablet mode.

19. A portable electronic apparatus for selectively operating in normal mode and tablet mode, comprising:

a touch-control liquid crystal display module;

a computer system for controlling operation of said liquid crystal display module, said computer system having a control switch such that activation of said control switch enables said computer system and said liquid crystal display to operate selectively in normal mode and tablet mode; and a processing system stored in said computer system to execute normal mode and, in response to the activation of said control switch, for enabling said portable electronic apparatus to selectively operate in normal mode and tablet mode.

\* \* \* \* \*